(12) United States Patent
Hawsah

(10) Patent No.: US 11,499,930 B2
(45) Date of Patent: Nov. 15, 2022

(54) MEASUREMENT OF CHLORIDE CONTENT IN CATALYSTS

(71) Applicant: SAUDI ARABIAN OIL COMPANY, Dhahran (SA)

(72) Inventor: Esam M. Hawsah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 698 days.

(21) Appl. No.: 16/522,014

(22) Filed: Jul. 25, 2019

(65) Prior Publication Data

US 2021/0025842 A1    Jan. 28, 2021

(51) Int. Cl.
| | |
|---|---|
| *B01J 21/04* | (2006.01) |
| *G01N 27/06* | (2006.01) |
| *B01J 21/20* | (2006.01) |
| *B01J 38/02* | (2006.01) |
| *B01J 38/52* | (2006.01) |
| *B01J 38/56* | (2006.01) |
| *G01N 31/16* | (2006.01) |

(52) U.S. Cl.
CPC .............. *G01N 27/06* (2013.01); *B01J 21/04* (2013.01); *B01J 21/20* (2013.01); *B01J 38/02* (2013.01); *B01J 38/52* (2013.01); *B01J 38/56* (2013.01); *G01N 31/16* (2013.01)

(58) Field of Classification Search
CPC ... B01J 21/00; B01J 21/04; B01J 21/20; B01J 38/60; B01J 38/02; B01J 38/52; B01J 38/56; B01J 38/54; G01N 27/06; G01N 31/16; G01N 27/07
See application file for complete search history.

(56) References Cited

U.S. PATENT DOCUMENTS

| | | | |
|---|---|---|---|
| 6,746,767 B2 | 6/2004 | Gottfried et al. | |
| 7,306,667 B2 | 12/2007 | Schumacher et al. | |
| 7,534,409 B2 | 5/2009 | Schumacher et al. | |
| 2002/0061407 A1 | 5/2002 | Colton et al. | |
| 2003/0008769 A1 | 1/2003 | Garoff et al. | |

FOREIGN PATENT DOCUMENTS

| | | |
|---|---|---|
| CN | 103163089 A | 6/2013 |
| CN | 208000303 U | 10/2018 |
| CN | 108872470 A | 11/2018 |
| JP | 6243649 B2 | 12/2017 |

OTHER PUBLICATIONS

International Search Report and Written Opinion of PCT Application No. PCT/US2020/043554 dated Nov. 24, 2020: pp. 1-15.

OIV, Compendium of International Methods of Analysis—OIV: Chloride, International Organisation of Vine and Wine, vol. 2, Edition 2012 (http://www.gie.uchile.cl/pdf/GIE_legislacion/Metodos%20Analisis_Vol.2.pdf).

UOP, A Honeywell Company, Total Chloride in Alumina and Silica-Alumina Catalysts by Microwave Digestion and Potentiometric Titration, UOP Method 291-15; 9 pgs, Date: Nov. 2015.

*Primary Examiner* — Smita S Patel
(74) *Attorney, Agent, or Firm* — Bracewell LLP; Constance G. Rhebergen; Eleanor L. Tyson

(57) ABSTRACT

Embodiments provide a method for determining a chloride content of an alumina-based catalyst used for catalytic reforming. The method includes the step of combining nitric acid, isopropanol, and the alumina-based catalyst such that the alumina-based catalyst is dissolved in the nitric acid and the isopropanol to form a homogenized mixture. The alumina-based catalyst include chloride. The method includes the step of taking a conductivity measurement of the homogenized mixture using a pair of electrodes. The method includes the step of introducing a titrant solution comprising silver nitrate to the homogenized mixture such that a precipitate of silver chloride is formed. The method includes the step of determining a chloride concentration of the homogenized mixture based on the conductivity measurement of the homogenized mixture. The method includes the step of determining the chloride content of the alumina-based catalyst based on the chloride concentration of the homogenized mixture.

13 Claims, No Drawings

MEASUREMENT OF CHLORIDE CONTENT IN CATALYSTS

BACKGROUND

Field of the Disclosure

Embodiments of the disclosure generally relate to measuring chloride content. More specifically, embodiments of the disclosure relate to a method for measuring chloride content in an alumina or silica-alumina catalyst.

Description of the Related Art

Catalytic reforming involves a chemical process converting naphtha into reformates (that is, the products of reforming), which are used as raw materials for producing high-octane gasoline or aromatics such as benzene, toluene, xylene, and ethylbenzene. The process includes converting paraffinic hydrocarbons into isoparaffinc or naphthenic hydrocarbons via isomerization, cyclization, or hydrocracking reactions. The isoparaffinic or naphthenic hydrocarbons may further undergo a dehydrogenation reaction to produce aromatic hydrocarbons.

Catalysts used for catalytic reforming typically include materials such as alumina or silica-alumina. Some catalysts include noble metals such as platinum and rhenium in addition to alumina or silica-alumina, where the noble metals may serve as catalysts for the dehydrogenation reaction while the alumina or silica-alumina may serve as catalysts for the isomerization, cyclization, or hydrocracking reactions. The alumina or silica-alumina catalyst may have a certain degree of chloride content which may be helpful or harmful to the performance of the catalyst. For example, an insufficient degree of chloride content may lead to reducing the noble metals to their catalytically inactive, elemental forms due to the presence of hydrogen. On the other hand, an excessive degree of chloride content may lead to suppressing the activity of the alumina or silica-alumina catalyst. In this sense, monitoring the chloride content of the alumina or silica-alumina catalyst is critical for determining the optimum performance for catalytic reforming.

SUMMARY

Embodiments of the disclosure generally relate to measuring chloride content. More specifically, embodiments of the disclosure relate to a method for measuring chloride content in an alumina or silica-alumina catalyst.

Embodiments of the disclosure provide a method for determining a chloride content of an alumina-based catalyst used for catalytic reforming. The method includes the step of combining nitric acid, isopropanol, and the alumina-based catalyst such that the alumina-based catalyst is dissolved in the nitric acid and the isopropanol to form a homogenized mixture. The alumina-based catalyst include chloride. The method includes the step of taking a conductivity measurement of the homogenized mixture using a pair of electrodes. The method includes the step of introducing a titrant solution comprising silver nitrate to the homogenized mixture such that a precipitate of silver chloride is formed. The method includes the step of determining a chloride concentration of the homogenized mixture based on the conductivity measurement of the homogenized mixture. The method includes the step of determining the chloride content of the alumina-based catalyst based on the chloride concentration of the homogenized mixture.

In some embodiments, the method further includes the step of retrieving the alumina-based catalyst from a catalytic reforming unit. The alumina-based catalyst is spent. In some embodiments, the method further includes the step of washing the alumina-based catalyst with a first solvent. The alumina-based catalyst includes hydrocarbon-based impurities. The first solvent dissolves the hydrocarbon-based impurities. The method further includes the step of removing the first solvent and the hydrocarbon-based impurities such that the alumina-based catalyst is in the absence of the hydrocarbon-based impurities. In some embodiments, the first solvent is n-pentane, o-xylene, m-xylene, p-xylene, or isopropanol. In some embodiments, the first solvent is heated at a temperature ranging from 40° C. to 60° C. in the removing step. In some embodiments, the method further includes the step of cooling the alumina-based catalyst to room temperature. In some embodiments, the combining step is conducted in an absence of heating the homogenized mixture. In some embodiments, the method further includes the step of seizing the introducing step when an endpoint is reached in the taking step. In some embodiments, the method is conducted in a timespan equal to or lesser than an hour. In some embodiments, the pair of electrodes includes a silver ring electrode and a reference electrode. The reference electrode includes a pH glass membrane. In some embodiments, the nitric acid has a concentration ranging from 95 wt. % to 99.5 wt. %. In some embodiments, the titrant solution has a silver nitrate concentration ranging from 0.01 M to 0.05 M. In some embodiments, the chloride content of the alumina-based catalyst ranges from 0.8 wt. % to 1 wt. %.

Embodiments of the disclosure also provide a method for determining a chloride content of an alumina-based catalyst used for catalytic reforming. The method includes the step of combining a strong acid, a second solvent, and the alumina-based catalyst such that the alumina-based catalyst is dissolved in the strong acid and the second solvent to form a homogenized mixture. The alumina-based catalyst includes chloride. The method includes the step of taking a conductivity measurement of the homogenized mixture using a pair of electrodes. The method includes the step of introducing a titrant solution comprising silver nitrate to the homogenized mixture such that a precipitate of silver chloride is formed. The method includes the step of determining a chloride concentration of the homogenized mixture based on the conductivity measurement of the homogenized mixture. The method includes the step of determining the chloride content of the alumina-based catalyst based on the chloride concentration of the homogenized mixture.

In some embodiments, the strong acid includes nitric acid. In some embodiments, the second solvent includes isopropanol. In some embodiments, the method further includes the step of retrieving the alumina-based catalyst from a catalytic reforming unit, wherein the alumina-based catalyst is spent. In some embodiments, the method further includes the step of washing the alumina-based catalyst with a first solvent including n-pentane. The alumina-based catalyst includes hydrocarbon-based impurities. The first solvent dissolves the hydrocarbon-based impurities. The method further includes the step of removing the first solvent and the hydrocarbon-based impurities such that the alumina-based catalyst is in the absence of the hydrocarbon-based impurities.

BRIEF DESCRIPTION OF THE DRAWINGS

No Figures.

DETAILED DESCRIPTION

The disclosure refers to particular features, including process or method steps. Those of skill in the art understand that the disclosure is not limited to or by the description of embodiments given in the specification. The subject matter of the disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure with respect to an identified property or circumstance, the term "substantially" refers to a degree of deviation that is sufficiently minimal so as to not measurably detract from the identified property or circumstance. The exact degree of deviation allowable may in some cases depend on the specific context.

Typically, chloride content measurement of a fresh or spent alumina or silica-alumina catalyst (referred to as the alumina-based catalyst throughout this disclosure) follows the standard reference method UOP 291, which is incorporated in this disclosure by reference in its entirety. The principle of the method outlined in UOP 291 is to dissolve the alumina-based catalyst sample in sulfuric acid in the presence of heat. A separate portion of the sample is heated at a temperature of about 900 deg. C. such that volatile substances escape the sample. In this manner, the loss on ignition (LOI) can be determined, which is factored in when determining the chloride content of the sample. Additionally, any existing noble metals in the sample must be reduced using magnesium in the presence of sulfuric acid. After the alumina-based catalyst sample is dissolved and the noble metals are reduced, the chloride content of the sample is measured via titration using a silver nitrate solution. The method outlined in UOP 291 takes about or more than 7 hours, where the sulfuric-acid dissolving step requires about 6 hours for the alumina-based catalyst to completely dissolve.

On the other hand, embodiments of the disclosure provide a method which advantageously reduces the overall measurement time to equal to or lesser than about 1 hour and reduces the amount of chemicals used in the analysis by about 20% in comparison with UOP 291. Moreover, the method does not require LOI determination or noble metal reduction, therefore reducing risks associated with the exposure to heat and corrosive environments.

In an example embodiment of the method, the alumina-based catalyst sample is obtained. The alumina-based catalyst sample can be a fresh sample (that is, an as-received sample) or a spent sample (that is, a sample retrieved from a catalytic reforming unit after undergoing catalytic reforming). The alumina-based sample can exist in a substantially spherical form or a powder form. In some embodiments, the alumina-based catalyst sample has a surface area of greater than 10 square meters per gram ($m^2/g$), alternately greater than 100 $m^2/g$, or alternately greater than 200 $m^2/g$. The alumina-based catalyst sample can include a certain degree of chloride. In some embodiments, the chloride content of the alumina-based catalyst sample can range from about 0.1 wt. % to about 3 wt. %, alternately from about 0.5 wt. % to about 2 wt. %, or alternately from about 0.8 wt. % to about 1 wt. %. Without being bound by any theory, a chloride content of greater than 1 wt. % is known to negatively affect the catalytic reforming performance of the alumina-based catalyst. In some embodiments, a fresh alumina-based catalyst can be chlorinated by means known in the art prior to use such that the alumina-based catalyst is activated.

The alumina-based catalyst sample undergoes a washing process to remove certain impurities. In the washing process, a first solvent is used to dissolve hydrocarbon-based impurities such as naphtha that can be included in the alumina-based catalyst sample. The first solvent can be any solvent capable of dissolving hydrocarbons. Non-limiting examples of the first solvent include n-pentane, o-xylene, m-xylene, p-xylene, and isopropanol. In at least one embodiment, the first solvent is n-pentane. In some embodiments, the naphtha is a light naphtha. The light naphtha can have an initial boiling point (IBP) ranging from about 20° C. to about 40° C., alternately from about 25° C. to about 35° C., and alternately from about 25° C. to about 30° C. The light naphtha can have a final boiling point (FBP) ranging from about 50° C. to about 150° C., alternately from about 70° C. to about 130° C., and alternately from about 80° C. to about 100° C. In at least one embodiment, the light naphtha has an IBP of about 28° C. and an FBP of about 80° C. In other embodiments, the naphtha is a heavy naphtha. The heavy naphtha can have an IBP ranging from about 60° C. to about 130° C., alternately from about 70° C. to about 110° C., and alternately from about 80° C. to about 90° C. The heavy naphtha can have an FBP ranging from about 150° C. to about 220° C., alternately from about 160° C. to about 190° C., and alternately from about 170° C. to about 180° C. In at least one embodiment, the heavy naphtha has an IBP of about 82° C. and an FBP of about 170° C. Still in other embodiments, the naphtha is a mixture of light naphtha and heavy naphtha. In some embodiments, the first solvent does not remove noble metals that can be included in the alumina-based catalyst sample. In other embodiments, the first solvent can remove the noble metals. After washing, the first solvent and the impurities are removed from the alumina-based catalyst sample. In some embodiments, the first solvent and the impurities are removed by evaporation. Optionally, the evaporation of the first solvent and the impurities can be conducted in the presence of heat followed by placing the sample in a desiccator for cooling to room temperature. The evaporation temperature can range from about 20° C. to about 100° C., alternately from about 30° C. to about 70° C., and alternately from about 40° C. to about 60° C. In at least one embodiment, the evaporation temperature is set at about 50° C. The washing process can be conducted multiple times to ensure that the hydrocarbon-based impurities are substantially removed from the alumina-based catalyst sample.

A quantity of the washed alumina-based catalyst sample is measured and is placed in a strong acid such that the alumina-based catalyst sample and the chloride included in the alumina-based catalyst sample are dissolved and form a homogenized mixture. The strong acid can be any acid capable of dissolving the alumina-based catalyst sample and the chloride included in the alumina-based catalyst sample. Non-limiting examples of the strong acid include nitric acid, sulfuric acid, and hydrochloric acid. In at least one embodiment, the strong acid is nitric acid. Without being bound by any theory, nitric acid allows the alumina-based catalyst and the chloride included in the alumina-based catalyst sample to completely dissolve at room temperature in about 5 minutes. In some embodiments, the concentration of the nitric acid may range from about 70 wt. % to about 100 wt. %, alternately from about 90 wt. % to about 99.9 wt. %, or alternately from about 95 wt. % to about 99.5 wt. %. In at least one embodiment, the nitric acid has a concentration of about 99 wt. %. Optionally, water can be added to the homogenized mixture.

A second solvent is added to the homogenized mixture. The second solvent can be any solvent capable of accelerating the dissolution of the alumina-based catalyst sample in the strong acid while not being consumed. Non-limiting examples of the second solvent include isopropanol. Without being bound by any theory, isopropanol accelerates and completes the dissolution of the alumina-based catalyst sample in the strong acid to form the homogenized mixture.

A pair of electrodes is placed in the homogenized mixture to take a conductivity measurement. The pair of electrodes is connected to a potentiometric titrator. Titration is conducted while the pair of electrodes combined with the potentiometric titrator is monitoring the conductivity of the homogenized mixture, where a titrant solution including silver nitrate is introduced into the homogenized mixture at a predetermined rate such that a precipitate of silver chloride is formed. Once the endpoint is reached, the titrator determines and displays the chloride concentration of the homogenized mixture and accordingly determines the chloride content of the alumina-based catalyst sample based on the chloride concentration of the homogenized mixture. In some embodiments, the silver nitrate concentration of the titrant solution may range from about 0.001 molar (M) to about 1 M, alternately from about 0.005 M to about 0.1 M, or alternately from about 0.01 M to about 0.05 M. In at least one embodiment, the titrant solution has a silver nitrate concentration of about 0.01 M. In some embodiments, the electrodes can include any suitable electrodes capable of potentiometrically titrating silver chloride. As a non-limiting example, a pair of electrodes can include a silver ring electrode and a reference electrode where the reference electrode includes a pH glass membrane.

EXAMPLES

The disclosure is illustrated by the following examples, which are presented for illustrative purposes only, and are not intended as limiting the scope of the invention which is define by the appended claims.

Comparative Example 21 samples of spent alumina-based catalyst (containing noble metals) were obtained and the chloride content of the 21 samples were measured according to the standard reference method UOP 291.

For each sample, about 2 grams (g) of the alumina-based catalyst were weighed and placed into a 250 milliliter (mL) beaker. In parallel, a separate portion of each sample was weighed to determine LOI according to the standard reference method UOP 954 at about 900° C. Using a graduated cylinder, about 75 mL of 20 wt. % sulfuric acid was added to the beaker containing the 2 g sample for chlorine content determination. Several boiling chips were added to the beaker. In a ventilated hood, the beaker was placed on a cool hot plate and an acorn condenser was placed on the top of the beaker. Cold tap water was running through the acorn condenser while the hot plate was turned on. The beaker containing the sample and sulfuric acid was heated until the temperature reached about 3° C. lesser than the boiling point of the liquid. The temperature was maintained for about or more than 6 hours until the sample was completely dissolved. The beaker was removed from the hot plate and was allowed to cool to room temperature. The acorn condenser was removed and rinsed with distilled water, catching the rinsings in the beaker.

Once the dissolution was complete, for each sample, about 15 mL of 20 wt. % sulfuric acid was added to the beaker. A magnetic stirring bar was added to the beaker and the magnetic stirrer was started. About 0.3 g of magnesium turnings were added to the beaker to dissolve for reduction. The beaker was covered with a watch glass. Once the magnesium turnings were completely dissolved, an additional amount of about 0.3 g of magnesium turnings were added to the beaker to ensure complete reduction of the noble metals. After the magnesium completely dissolved, the watch glass was rinsed with distilled water, catching the rinsings in the beaker.

Once the reduction was complete, for each sample, a silver ring electrode with a pH glass membrane as a reference electrode (Metrohm AG, Switzerland) were placed in the beaker. The electrodes were connected to a potentiometric titrator (Metrohm AG, Switzerland). Distilled water was added to the beaker to ensure complete electrode immersion such that the total volume of the liquid contained in the beaker is about 100 mL. About 0.2 g of filter aid was added to the beaker to prevent silver chloride precipitate from depositing onto the electrodes. The sample was titrated with 0.1 M silver nitrate titrant solution at a titration rate of about 2.5 milliliters per minute (mL/min) while the magnetic stirrer was still in operation. As the endpoint approached, the titration rate was reduced to about 0.1 mL/min. The endpoint was determined by the potentiometric titrator based on conductivity measurement of the titrated sample. About 10 mL to about 16 mL of the silver nitrate titrant solution were consumed to reach the endpoint. The chloride concentration of the titrated sample was determined and displayed by the potentiometric titrator. Accordingly, the chloride content of the spent alumina-based catalyst was determined based on the concentration of the titrated sample and the LOI. The overall process for each sample took greater than about 6 hours.

The results are shown in Table 1. Table 1 shows the chloride content in wt. % of the 21 samples of the spent alumina-based catalyst measured according to the standard reference method UOP 291.

TABLE 1

| Sample No. | Chloride Content (wt. %) |
|---|---|
| 1 | 0.7 |
| 2 | 0.81 |
| 3 | 1.01 |
| 4 | 0.99 |
| 5 | 0.97 |
| 6 | 0.81 |
| 7 | 1.1 |
| 8 | 1.2 |
| 9 | 0.93 |
| 10 | 0.8 |
| 11 | 0.8 |
| 12 | 0.7 |
| 13 | 1.1 |
| 14 | 1.28 |
| 15 | 1.2 |
| 16 | 1.4 |
| 17 | 1.1 |
| 18 | 1.1 |
| 19 | 1.05 |
| 20 | 1.1 |
| 21 | 0.8 |

Example

The chloride content of the same 21 samples of spent alumina-based catalyst used in the Comparative Example were measured according to an example embodiment of the disclosure.

For each sample, a quantity of greater than 50 g of the alumina-based catalyst was placed into a 50 mL beaker. A sufficient volume of n-pentane as the first solvent was added to the beaker to wash the alumina-based catalyst. The beaker was placed in a ventilated oven at about 50° C. for a minimum of about 5 minutes so to evaporate the n-pentane and to dry the washed alumina-based catalyst. Optionally, the washing process was conducted multiple times to ensure the hydrocarbon-based impurities were removed. Then, the beaker was placed in a desiccator to cool to room temperature. About 2 g of the dried and washed alumina-based catalyst were weighed and placed into a separate 250 mL beaker. Using a graduated cylinder, about 50 mL of distilled water was added to the beaker containing the 2 g sample for chlorine content determination. About 5 mL of about 99 wt. % concentrated nitric acid as the strong acid were added to the beaker. About 5 mL of isopropanol as the second solvent was added to the beaker. A magnetic stirring bar was added to the beaker and the magnetic stirrer was operated for about 5 minutes to ensure the sample was completely dissolved and formed a homogenized mixture.

One the dissolution was complete, for each sample, a silver ring electrode with a pH glass membrane as a reference electrode (Metrohm AG, Switzerland) were placed in the beaker. The electrodes were connected to a potentiometric titrator (Metrohm AG, Switzerland). Distilled water was added to the beaker to ensure complete electrode immersion such that the total volume of the liquid contained in the beaker is about 100 mL. About 0.2 g of filter aid was added to the beaker to prevent silver chloride precipitate from depositing onto the electrodes. The sample was titrated with 0.1 M silver nitrate titrant solution at a titration rate of about 2.5 mL/min while the magnetic stirrer was still in operation. As the endpoint approached, the titration rate was reduced to about 0.1 mL/min. The endpoint was determined by the potentiometric titrator based on conductivity measurement of the titrated sample. About 4 mL to about 6 mL of the silver nitrate titrant solution were consumed to reach the endpoint. The chloride concentration of the titrated sample was determined and displayed by the potentiometric titrator. Accordingly, the chloride content of the spent alumina-based catalyst was determined based on the concentration of the titrated sample. The overall process for each sample took less than about 1 hour.

The results are shown in Table 2. Table 2 shows the chloride content in wt. % of the 21 samples of the spent alumina-based catalyst measured according to an example embodiment of the disclosure.

TABLE 2

| Sample No. | Chloride Content (wt. %) |
|---|---|
| 1 | 0.68 |
| 2 | 0.81 |
| 3 | 0.93 |
| 4 | 0.9 |
| 5 | 0.9 |
| 6 | 0.74 |
| 7 | 1.02 |
| 8 | 1.1 |
| 9 | 0.91 |
| 10 | 0.8 |
| 11 | 0.7 |
| 12 | 0.7 |
| 13 | 1.07 |
| 14 | 1.14 |
| 15 | 1.1 |
| 16 | 1.2 |
| 17 | 1.0 |
| 18 | 1.0 |
| 19 | 1.1 |
| 20 | 1.0 |
| 21 | 0.8 |

As shown in Tables 1 and 2, the chloride content measurements of the 21 alumina-based catalyst samples according to an embodiment of the disclosure generally agreed with the chloride content measurements of the same 21 alumina-based catalyst samples according to the standard reference method UOP 291. In addition, the chloride content measurement method according to an embodiment of the disclosure took significantly lesser time than the UOP 291 method.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for determining a chloride content of an alumina-based catalyst used for catalytic reforming, the method comprising the steps of:
    combining a nitric acid, an isopropanol, and the alumina-based catalyst such that the alumina-based catalyst is dissolved in the nitric acid and the isopropanol to form a homogenized mixture, wherein the alumina-based catalyst includes chloride;
    taking a conductivity measurement of the homogenized mixture using a pair of electrodes;
    introducing a titrant solution comprising a silver nitrate to the homogenized mixture such that a precipitate of silver chloride is formed;
    determining a chloride concentration of the homogenized mixture based on the conductivity measurement of the homogenized mixture; and
    determining the chloride content of the alumina-based catalyst based on the chloride concentration of the homogenized mixture.

2. The method of claim 1, further comprising the step of:
    retrieving the alumina-based catalyst from a catalytic reforming unit, wherein the alumina-based catalyst is a spent alumina-based catalyst.

3. The method of claim 1, further comprising the steps of:
    washing the alumina-based catalyst with a first solvent, wherein the alumina-based catalyst includes hydrocarbon-based impurities, wherein the first solvent dissolves the hydrocarbon-based impurities; and
    removing the first solvent and the hydrocarbon-based impurities such that the alumina-based catalyst is in the absence of the hydrocarbon-based impurities.

4. The method of claim 3, wherein the first solvent is selected from the group consisting of n-pentane, o-xylene, m-xylene, p-xylene, isopropanol, and combinations of the same.

5. The method of claim 3, wherein the first solvent is heated at a temperature ranging from 40° C. to 60° C. in the removing step.

6. The method of claim 5, further comprising the step of:
    cooling the alumina-based catalyst to a room temperature.

7. The method of claim 1, wherein the combining step is conducted in an absence of heating the homogenized mixture.

8. The method of claim 1, further comprising the step of:
    seizing the introducing step when an endpoint is reached in the taking step.

9. The method of claim 1, wherein the method is conducted in a timespan equal to or lesser than an hour.

10. The method of claim 1, wherein the pair of electrodes comprises a silver ring electrode and a reference electrode, wherein the reference electrode comprises a pH glass membrane.

11. The method of claim 1, wherein the nitric acid has a concentration ranging from 95 wt. % to 99.5 wt. %.

12. The method of claim 1, wherein the silver nitrate in the titrant solution has a concentration ranging from 0.01 M to 0.05 M.

13. The method of claim 1, wherein the chloride content of the alumina-based catalyst ranges from 0.8 wt. % to 1 wt. %.

* * * * *